United States Patent [19]

Meyer et al.

[11] 4,223,127

[45] Sep. 16, 1980

[54] POLYAMIDES FROM 2,4'-DIAMINODICYCLOHEXYL METHANE

[75] Inventors: Rolf-Volker Meyer; Rolf Dhein; Hans Rudolph, all of Krefeld-Uerdingen, Fed. Rep. of Germany

[73] Assignee: Bayer Aktiengesellschaft, Leverkusen-Bayerwerk, Fed. Rep. of Germany

[21] Appl. No.: 925,872

[22] Filed: Jul. 18, 1978

[30] Foreign Application Priority Data

Dec. 1, 1977 [DE] Fed. Rep. of Germany ....... 2753577

[51] Int. Cl.² ............................................. C08G 69/14
[52] U.S. Cl. ............................. 528/324; 260/33.4 R; 260/33.4 P; 428/476.9; 528/229; 528/321; 528/327; 528/330; 528/331; 528/342; 528/349
[58] Field of Search ................................. 528/324, 330

[56] References Cited

U.S. PATENT DOCUMENTS

| | | | |
|---|---|---|---|
| 3,598,789 | 8/1971 | Tippetts ................................ | 528/324 |
| 3,703,595 | 11/1972 | Falkenstein ........................ | 528/324 |
| 3,847,877 | 11/1974 | Nielinger et al. ................. | 528/324 |

FOREIGN PATENT DOCUMENTS 1403916  8/1975  United Kingdom ..................... 528/324

*Primary Examiner*—Harold D. Anderson
*Attorney, Agent, or Firm*—Connolly and Hutz

[57] ABSTRACT

Transparent copolyamides obtained by polycondensing a lactam or a corresponding amino acid, an aliphatic and/or aromatic dicarboxylic acid and a mixture of hydrogenated condensation products of aniline and formaldehyde.

9 Claims, No Drawings

POLYAMIDES FROM 2,4'-DIAMINODICYCLOHEXYL METHANE

It is known that the crystallinity of polyamides, such as polyamide-6 or polyamide-6,6, can be reduced by the incorporation of comonomers, and that it is thus possible to modify the properties of the homopolyamides.

It is possible in this way, for example, to improve the transparency of polyamides, to increase their toughness, to alter their melt viscosity and hence to vary the processibility.

Suitable modifying monomers are, in principle, dicarboxylic acids, particularly aliphatic dicarboxylic acids containing from 6 to 12 carbon atoms or aromatic dicarboxylic acids containing at least 8 carbon atoms, preferably isophthalic acid and terephthalic acid.

Preferred diamines for modification are optionally branched aliphatic diamines containing at least 6 carbon atoms in the longest C-chain, araliphatic or even cycloaliphatic diamines too. Cycloaliphatic diamines in particular are used in the polycondensation reaction for obtaining relatively high solidification values, improved dimensional stability under heat, and transparency.

In addition to 3-aminomethyl-3,5,5-trimethyl-1-cyclohexyl-amine and bis-aminomethyl cyclohexanes, 4,4'-diaminodicyclohexyl methanes are also preferably used.

Thus, according to German Offenlegungsschrift No. 2,159,803=British Pat. No. 1,403,916 transparent thermoplastically processible polyamides suitable for the production of mouldings and films are obtained from isophthalic acid, 4,4'-diaminodicyclohexyl methane and caprolactum. One disadvantage, however, attending the production of these polyamides is the fact that, although only the use of pure 4,4'-diaminodicyclohexyl methane is recommended, the other positional isomeric diaminodicyclohexyl methanes, such as 2,4'-diaminodicyclohexyl methane and 2,2'-diaminodicyclohexyl methane, are usually also formed during the production of the diamino component. Thus, an additional distillation step, which adds to the cost of the product, generally has to be carried out before the hydrogenation of 4,4'-diaminodiphenyl methanes in order to separate the other diaminodiphenyl methanes, or alternatively a special process has to be adopted to produce only 4,4'-diaminodiphenyl methanes. In addition, the mixtures also contain fractions of higher functionality, particularly polyaminocyclohexylmethyl compounds.

It has now been surprisingly found that, in the production of copolyamides using mixtures of polycyclohexylpolyaminomethanes which, in addition to 4,4'-diaminocyclohexyl methane, contain from 1 to 30 mole % and preferably from 3 to 20 mole % of 2,4'-isomers, from 0 to 2 mole % and preferably from 0 to 1 mole % of 2,2'-isomers and, optionally, up to 10 mole % of bis (aminocyclohexylmethyl)-cyclohexylamines, there is no deterioration in the properties, such as transparency or processibility, of the polyamides. Instead, there is an actual improvement in these properties.

Accordingly, the present invention relates to copolyamides obtained by polycondensing:

I. from 10 to 98% by weight of lactam containing at least 5 carbon atoms in the ring or a corresponding aminocarboxylic acid, II. from 2 to 90% by weight of equivalent quantities of:

(a) an aliphatic dicarboxylic acid containing from 2 to 20 carbon atoms and/or an aromatic dicarboxylic acid containing from 8 to 20 carbon atoms; and (b) a mixture of polyaminopolycyclohexyl methyl compounds, corresponding to the following general formula (A)

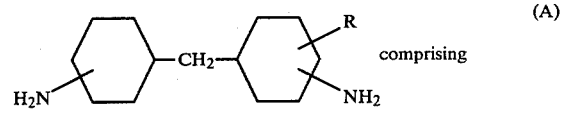

comprising (α) from 70 to 99 mole % and preferably from 75 to 95 mole % of 4,4'-diaminodicyclohexyl methanes, (R=H)

(β) from 1 to 30 mole % and preferably from 5 to 25 mole % of 2,4'-diaminodicyclohexyl methanes, (R=H)

(γ) from 0 to 2 mole % and preferably from 0 to 1 mole % of 2,2'-diaminodicyclohexyl methanes (R=H) and (δ) from 0 to 10 mole % and preferably from 0 to 5 mole % of a triamine corresponding to the general formula A wherein R represents

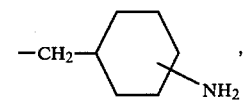

the sum of (I) and (II) always amounting to 100% by weight and the sum of α-δ to 100 mole %.

Particularly preferred polyamides are polyamides obtained by polycondensing from 30 to 45% by weight of component (I) and from 70 to 55% by weight of component (II), because these products show particularly good thermoplastic processing properties and give transparent polyamides, even when present in thick layers. Polyamides obtained by polycondensing from 60 to 98% by weight of component (I) and from 40 to 2% by weight of component (II) are also particularly preferred because they are eminently suitable for the production of transparent composite films and foils with polyethylenes.

The aminocarboxylic acids used may be aminocarboxylic acids containing from 5 to 20 carbon atoms, optionally in the form of the corresponding lactams. ε-Aminocaproic acid or ε-caprolactam, aminoundecanoic acid and lauric lactam and also mixtures of these components, are preferably used for producing the polyamides according to the present invention.

The polycyclohexylmethyl polyamino compounds comprising component (b) which may be used for producing the copolyamides according to the present invention may be readily obtained from aniline and formaldehyde, followed by hydrogenation of the aromatic polynuclear polyamines.

Each of the positional isomers of the diaminodicyclohexyl methanes consists of trans, trans-; cis, trans- and a minor proportion of cis, cis-isomers. The mixture of polyaminocyclohexylmethyl compounds may have a melting point ca. 30° C. but if it contains less than 90% of 4,4'-isomers it may be liquid at room temperature.

Up to 20% by weight of the diamine component (II b) may be replaced by $C_2$—$C_{20}$ -aliphatic diamines, preferably hexamethylene diamine, by $C_6$—$C_{15}$-cycloaliphatic diamines which are different from the diamines of component (b), preferably 1,3- and 1,4-bis-aminomethyl cyclohexane, mixtures of dimethylaminotricyclodecanes or isophorone diamine, or by $C_7$—$C_{20}$-araliphatic diamines, preferably m, and p-xylylene diamine, 2,5-dimethyl-, p-xylylene diamine or 2,4-dimethyl-m-xylylene diamine.

Suitable aliphatic or cycloaliphatic dicarboxylic acids used for the production of the invention copolyamides contain up to 20 carbon atoms. Suitable aliphatic dicarboxylic acids are above all, compound corresponding to the following general formula:

$$HOOC-(CH_2)_m-COOH$$

wherein m represents an integer of from 4 to 10, whilst suitable cycloaliphatic dicarboxylic acids are the stereo-isomeric 1,3-cyclopentane dicarboxylic acids, 1,3- and 1,4-cyclohexane dicarboxylic acid and the 4,4'-dicyclohexyl dicarbocylic acids. Adipic acid and azelaic acid are particularly suitable.

Suitable aromatic dicarboxylic acids used for the production of the inventive copolyamide contain from 7 to 20 and preferably from 8 to 15 carbon atoms. Examples of such acids are mononuclear dicarboxylic acids of the benzene series, such as 3,5-pyridine dicarboxylic acid, 1,4-, 1,5- and other naphthalene dicarboxylic acids, 4,4'-diphenyl dicarboxylic acid, diphenyl sulphone dicarboxylic acids and benzophenone dicarboxylic acids, preferably terephthalic acid and isophthalic acid.

Mixtures of the above-mentioned dicarboxylic acids may also be used.

The copolyamides according to the present invention may be obtained by melt condensation using known methods.

The diamine mixture and the dicarboxylic acids or even the salts of the diamines and the dicarboxylic acids, and the aminocarboxylic acids or the corresponding lactams are introduced into a stirrer-equipped autoclave in stoichiometric quantities or in substantially stoichiometric quantities, optionally with the addition of water and/or acetic acid. They are then heated to form a melt, the steam which is formed being let off after a while. The mixture is stirred for a while in an inert gas stream, after which the condensation reaction is continued, optionally in vacuo, until the required molecular weight of the copolyamide has been reached.

The copolyamides obtained are transparent and can be thermoplastically processed without difficulty using conventional moulding machines. They may contain auxiliaries as additives, for example, lubricants, mould release agents, dyes, glass-fibers, fillers, and flameproofing agents. The copolyamides can be used for the production of transparent, shaped articles of any kind, particularly films and fishing lines.

EXAMPLE 1

2.4 kg of ε-caprolactam (32%, based on the polyamide), 2.49 kg (15 moles) of isophthalic acid and 3.15 kg (15 moles) of hydrogenated diaminodiphenyl methane I are introduced, together with 2 liters of water, into an antoclave having a capacity of 12 liters. 20 g of benzoic acid are added to stabilise the molecular weight and 30 g of hydrogenated diaminodiphenyl methane I are added to compensate for any losses of diamine occurring during the polycondensation reaction.

The mixture is heated under nitrogen to approximately 200° C., the stirrer being switched on when the temperature reaches 100° C., and the reaction mixture is maintained under its own pressure for 4 hours. It is then slowly vented, heated to 270° C. and polycondensed for 7 hours at 270° C.

The transparent polyamide obtained ($\eta_{rel}$ 2.4(*)) is spun through a water bath, granulated and dried. 6 (*)as measured on a 1% solution in m-cresol at 25° C.

Standard small test bars are found to have a dimensional stability under heat, as measured according to Vicat (method B) of 149° C. (DIN 53 460), a notched impact strength of 5.2 kJ/m² (DIN 53 453) and a flexural strength of 162 MPa (DIN 53 452). No breakages occurred when 10 test specimens were subjected to impact strength testing (DIN 53 453).

COMPOSITION OF THE HYDROGENATED DIAMINODIPHENYL METHANE I 94.7 mol % of 4,4'-diaminodicyclohexyl methanes
5.1 mol % of 2,4'-diaminodicyclohexyl methanes
0.2 mol % of 2,2'-diaminodicyclohexyl methanes

EXAMPLE 2

3.14 kg of ε-caprolactam (38% by weight based on the polyamide), 2.49 kg (15 moles) of isophthalic acid and 3.15 kg (15 moles) of hydrogenated diaminodiphenyl methane I are introduced into the autoclave in the same way as described in Example 1, and the monomer mixture is polycondensed in the same way.

The almost colourless transparent polyamide obtained has a relative viscosity of 2.3, a dimensional stability under heat as measured according to Vicat (method B) of 140° C., a flexural strength of 162 MPa and a notched impact strength of 5.8 kJ/m². No breakages occurred when 10 test specimens were subjected to impact strength testing.

Comparision Test A

The procedure is as described in Example 1, except that 4,4'-diaminodicyclohexyl methane (stereo isomer mixture) melting at approximately 35° C. is used instead of the hydrogenated diaminodiphenyl methane I. The polyamide obtained has a relative viscosity of 2.1(*), a flexural strength of 155 MPa and a notched impact strength of only 3.8 kJ/m².
(*) as measured on a 1% solution in m-cresol at 25° C.

The material cannot be processed as well as the relatively high molecular weight product obtained in Example 1 using conventional injection moulding machines.

EXAMPLE 3

9.04 kg (80 moles) of ε-caprolactam, 0.7 kg (3.33 moles) of hydrogenated diaminodiphenyl methane I and 0.52 kg (3.2 moles) of isophthalic acid are introduced under nitrogen into an autoclave, heated for 3 hours to 270° C., and polycondensed for 7 hours at 270° C.

The product obtained is spun off through a water bath and chopped up. After extraction of the monomer content and drying, a transparent granulate having a relative viscosity of 3.1(*) is obtained. The product can be drawn without difficulty and processed into highly transparent brilliant-gloss fishing lines.
(*) as measured on a 1% solution in m-cresol at 25° C.

EXAMPLE 4

9.04 kg (80 moles) of ε-caprolactam, 0.7 kg (3.33 moles) of hydrogenated diaminodiphenyl methane I and 0.6 kg (3.2 moles) of azelaic acid are condensed to form a polyamide in the same way as described in Example 3.

After extraction of the monomer content and drying, a transparent granulate having a relative viscosity of 3.0(*) is obtained. The product can be drawn without difficulty and processed into highly transparent brilliant-gloss fishing lines.

(*) as measured on a 1% solution in m-cresol at 25° C.

EXAMPLE 5

The procedure is as described in Example 4 except that the hydrogenated diaminodiphenyl methane I is replaced as the amine component by hydrogenated diaminodiphenyl methane II having the following composition:
90.9 mol % of 4,4'-diaminodicyclohexyl methanes
4.9 mol % of 2,4'-diaminodicyclohexyl methanes
0.2 mol % of 2,2'-diaminodicyclohexyl methanes
4.0 mol % of 2,4'-bis-(4-aminocyclohexylmethyl)-cyclohexylamines.

After extraction of the monomer content and drying, a transparent granulate having a relative viscosity of 3.5 is obtained. The product can also be drawn without difficulty and processed into high quality fishing lines.

EXAMPLE 6

9.95 kg (85 moles) of ε-caprolactam, 0.22 kg (1 mole) of hydrogenated diaminodiphenyl methane I and 0.16 kg (950 mMoles) of isophthalic acid are polycondensed whilst being stirred in a nitrogen atmosphere first for 1 hour at 200° C. and then for 7 hours at 270° C. The copolyamide is spun off in the form of a filament into a water bath, chopped up, extracted with water at 95° C. and dried.

The product, which is transparent in thin layers having thickness of 100 μm) has a relative viscosity of 3.2.(*)

(*) as measured on a 1% solution in m-cresol at 25° C.

The polyamide obtained can be co-extruded with polyethylene having a density of approximately 0.92 and a melt index of from 0.3 to 0.5 in a standard three-layer blowing machine to form a high quality composite film, using Surlyn A 1652(R) for example as an adhesion promotor.

The composite film obtained is distinguished by its high transparency, brilliant surface gloss and outstanding deep-drawing properties. By virtue of the high softening point of the polyamide (212° C.), the composite film can also be sealed without difficulty in standard packaging machines.

EXAMPLE 7

The procedure is as described in Example 6, except that the hydrogenated diaminodiphenyl methane I is replaced as the amine component by hydrogenated diaminodiphenyl methane II (the composition of which is given in Example 5).

The polyamide obtained is transparent in a layer thickness of up to 100 μm, and has a relative viscosity of 3.6.(*)

(*) as measured on a 1% solution in m-cresol at 25° C.

The product can also be processed to form high quality transparent composite films in the same way as described in Example 6.

Comparison Test B

The procedure is as described in Example 6, except that the hydrogenated diaminodiphenyl methane I is replaced as the amine component by 4,4'diaminodicyclohexyl methane (stereo isomer mixture melting at approx. 35° C.). The product obtained after extraction and drying has a relative viscosity of 3.1.(*)

(*) as measured on a 1% solution in m-cresol at 25° C.

Films produced from the polyamide thus obtained are opaque, even in a layer thickness of 50 μm, and show a pronounced tendency towards post-crystallisation.

What is claimed is:

1. A film forming copolyamide obtained by condensing a mixture consisting of (I) from 10 to 98% by weight of a lactam containing at least 5 carbon atoms in the ring or a corresponding aminocarboxylic acid and
(II) from 2 to 90% by weight of equivalent quantities of
   (a) an aliphatic dicarboxylic acid having from 2 to 20 carbon atoms, an aromatic dicarboxylic acid having from 8 to 20 carbon atoms or a mixture thereof and
   (b) a mixture containing
       (i) from 70 to 95 mol % of 4,4'-diaminodicyclohexyl methane,
       (ii) from 5 to 30 mol % of 2,4'-diaminodicyclohexyl methane,
       (iii) from 0 to 2 mol % of 2,2'-diaminodicyclohexyl methane and
       (iv) from 0 to 10 mol % of a triamine of the formula

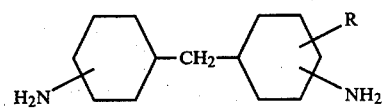

wherein R is

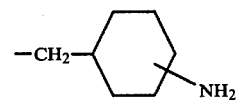

2. A copolyamide as claimed in claim 1 obtained by condensing from 30 to 45% by weight of component I and from 70 to 55% by weight of component II.

3. A copolyamide as claimed in claim 1 obtained by condensing from 60 to 98% by weight of component I and from 2 to 40% by weight of component II.

4. A copolyamide of claim 1 wherein (b) contains
   (i) from 75 to 95 mol % of 4,4'-diaminodicyclohexyl methane,
   (ii) from 5 to 25 mol % of 2,4'-diaminodicyclohexyl methane,
   (iii) from 0 to 1 mol % of 2,2'diaminodicyclohexyl methane and
   (iv) from 0 to 5 mol % of said triamine of said formula.

5. A copolyamide as claimed in claim 1 wherein component (iv) is 2,4-bis-(4-aminocyclohexylmethyl)-cyclohexylamine.

6. A copolyamide as claimed in claim 1 wherein component I is ε-caprolactam.

7. A copolyamide as claimed in claim 1 wherein the aliphatic dicarboxylic acid of (a) is adipic acid or azelaic acid.

8. A copolyamide as claimed in claim 1 wherein the aromatic dicarboxylic acid of (b) is iso- or terephthalic acid.

9. A transparent film or fishing line produced from the copolyamide of claim 1.

* * * * *